(12) United States Patent
Luo et al.

(10) Patent No.: US 9,075,478 B2
(45) Date of Patent: Jul. 7, 2015

(54) REFLECTIVE TOUCH DISPLAY AND FABRICATION METHOD THEREOF

(75) Inventors: Jianxing Luo, Jianyang (CN); Jiodong Chen, Guixi (CN); Pingping Huang, Xiamen (CN); Yau-Chen Jiang, Zhubei (CN)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 0 days.

(21) Appl. No.: 13/450,491

(22) Filed: Apr. 19, 2012

(65) Prior Publication Data

US 2013/0063967 A1   Mar. 14, 2013

(30) Foreign Application Priority Data

Sep. 12, 2011  (CN) .......................... 2011 1 0281016

(51) Int. Cl.
*F21V 7/04* (2006.01)
*G06F 3/042* (2006.01)

(52) U.S. Cl.
CPC .............. *G06F 3/042* (2013.01); *Y10T 156/10* (2015.01); *G06F 2203/04103* (2013.01); *G06F 2203/04109* (2013.01)

(58) Field of Classification Search
CPC .......... G06F 3/042; G06F 2203/04103; G06F 2203/04109; Y10T 156/10
USPC .......................................... 362/600, 602, 603
See application file for complete search history.

(56) References Cited

U.S. PATENT DOCUMENTS

| 2006/0262568 A1* | 11/2006 | Blom et al. ................... 362/625 |
| 2008/0158181 A1* | 7/2008 | Hamblin et al. .............. 345/173 |
| 2011/0227487 A1* | 9/2011 | Nichol et al. ................. 315/158 |
| 2011/0273673 A1* | 11/2011 | Masalkar ........................ 353/38 |

FOREIGN PATENT DOCUMENTS

| JP | 2004185380 A | 7/2004 |
| TW | I229306 | 3/2005 |

* cited by examiner

*Primary Examiner* — Donald Raleigh
(74) *Attorney, Agent, or Firm* — Gokalp Bayramoglu

(57) ABSTRACT

The present disclosure relates to a display device, and more particularly to a reflective touch display and a fabrication method thereof. The reflective touch display comprises a reflective display device, a first bonding layer, a light guiding plate, a second bonding layer, and a touch screen. The light guiding plate is laminated to top surface of the reflective display through the first bonding layer. The touch screen is laminated to top surface of the light guiding plate through the second bonding layer. The first bonding layer and the second bonding layer are formed by a liquid bonding material that transforms from a liquid state to a solid state, wherein refraction index of each of the first and second bonding layer is less than that of the light guiding plate. In accordance with the present disclosure, yield rate can be increased and production cost can be reduced.

19 Claims, 4 Drawing Sheets

REFLECTIVE TOUCH DISPLAY AND FABRICATION METHOD THEREOF

This application claims the benefit of Chinese application No. 201110281016.0, filed on Sep. 12, 2011.

BACKGROUND OF THE INVENTION

1. Field of the Invention

The present disclosure relates to a reflective display, and more particularly to a reflective touch display and a fabrication method thereof.

2. Description of the Related Art

Traditional reflective touch display 1, as illustrated in FIG. 1, comprises a touch screen 10, bonding layers 11 and 15, solid optical adhesive layers 12 and 14, a light guiding plate 13, and a reflective display device 16. The solid optical adhesive layers 12 and 14 are separately laminated on the top surface and lower surface of the light guiding plate 13. The bonding layers 11 and 15 are generally liquid optical adhesive layers. The light guiding plate 13 having the solid optical adhesive layers 12 and 14 is laminated to top surface of the reflective display device 16 through the bonding layer 15. The touch screen 10 is laminated on top surface of the solid optical adhesive layer 12 through the bonding layer 11.

While the external light source is sufficient, the reflective display device 16 reflects the external light source that is incident from the top surface of the touch screen 10 to display scripts and patterns on the screen 10 for users to view. However, if the external light source is insufficient, the reflective display device 16 can not reflect weak light source to display the scripts and patterns on the screen, and therefore a built-in light source 17 needs to be built in the reflective display device 16 for enough brightness. The built-in light source 17 can be set on side of the light guiding plate 13 to enable the built-in light source 17 incident into the light guiding plate 13. Refractive index of light guiding plate 13 can be greater than the refractive indexes of the solid optical adhesive layers 12 and 14. For example, if refractive index of the light guiding plate 13 is 1.52, then refractive indexes of the solid optical adhesive layers 12 and 14 are 1.47. According to optical principle, while the light transmits from optically denser medium to optically thinner medium, if the angle of incidence is greater than arcsin $(1.47/1.52) \approx 75°$, light can be fully reflected in optically denser medium, and therefore the light can be confined in the light guiding plate 13. By means of appropriately designing the light guiding plate 13, the built-in light source 17 can collect light dining the transmission in the light guiding plate 13 so that the reflective display device 16 is as bright as if it has a back light source and therefore the built-in light source 17 compensates for defect of shortage of back light source.

However, since the traditional reflective touch display 1 has to be laminated multiple times, the corresponding fabrication process is comparatively complicated, which reduced the optical property of products. Moreover, viscidity of the solid optical adhesive layer 12 and the bonding layer 11 is different. Hence, the solid optical adhesive layer 12 and the bonding layer 11 may separate from each other because of incompatibility of two different kinds of adhesives.

SUMMARY OF THE INVENTION

An object of the present disclosure is to provide a reflective touch display. A liquid optical adhesive having a refractive index lower than that of a light guiding plate can be used as a laminating material, which omits the use of a solid optical adhesive, which as a result further reduces the number of times lamination needs to be carried out, in turn simplifying the process and improving optical property of products. The problem that is caused by poor viscidity between liquid optical adhesive and solid optical adhesive layer is also overcome.

The reflective touch display comprises a reflective display device, a first bonding layer, a light guiding plate, a second bonding layer, and a touch screen. The light guiding plate is laminated to top surface of the reflective display device through the first bonding layer. The touch screen is laminated to top surface of the light guiding plate through the second bonding layer. The first and second bonding layers are formed by a liquid bonding material that transforms from liquid to solid, wherein refractive index of the first and second bonding layer is less than refractive index of the light guiding plate.

Refractive index of the light guiding plate is between 1.47 and 2.02. The refractive indexes of the first bonding layer and the second bonding layer are between 1.10 and 2.00. The reflective display device further comprises a built-in reflective display screen and a diffuser. The diffuser is disposed either on top surface of the reflective display screen or embedded in the reflective display screen. The first bonding layer and the second bonding layer comprises a silicone resin or an acrylic resin or a combination of the silicone and the acrylic. The bonding layers are made of liquid optical adhesives. The first bonding layer and the second bonding layer are ultraviolet light solid adhesives. The reflective touch display further comprises a flexible circuit. The flexible circuit is set on the side of the light guiding plate, and the flexible circuit comprises a plurality of light-emitting diodes, which are subsequently used as built-in light sources.

Another objective of the present disclosure is to provide a fabrication method for a reflective touch display device, comprising laminating a light guiding plate to top surface of the reflective display device through a first bonding layer; laminating a touch screen to top surface of the light guiding plate through a second bonding layer. The first bonding layer and the second bonding layer are made of a liquid bonding material that transforms from liquid state to solid state, wherein refractive indices of the first bonding layer and second bonding layer are less than refractive index of the light guiding plate.

Thus, the disclosure provides a reflective touch display device and a fabrication method thereof wherein the number of times the lamination processes is done as well as the probability of rejection caused by the poor lamination is reduced, and the yield rate of the reflective touch display is increased.

BRIEF DESCRIPTION OF THE DRAWINGS

For those skilled in the art, embodiments and drawings described below are for illustration purpose only and do not limit the scope of the present disclosure in any manner.

DETAILED DESCRIPTION OF THE EMBODIMENTS

Figure 1:
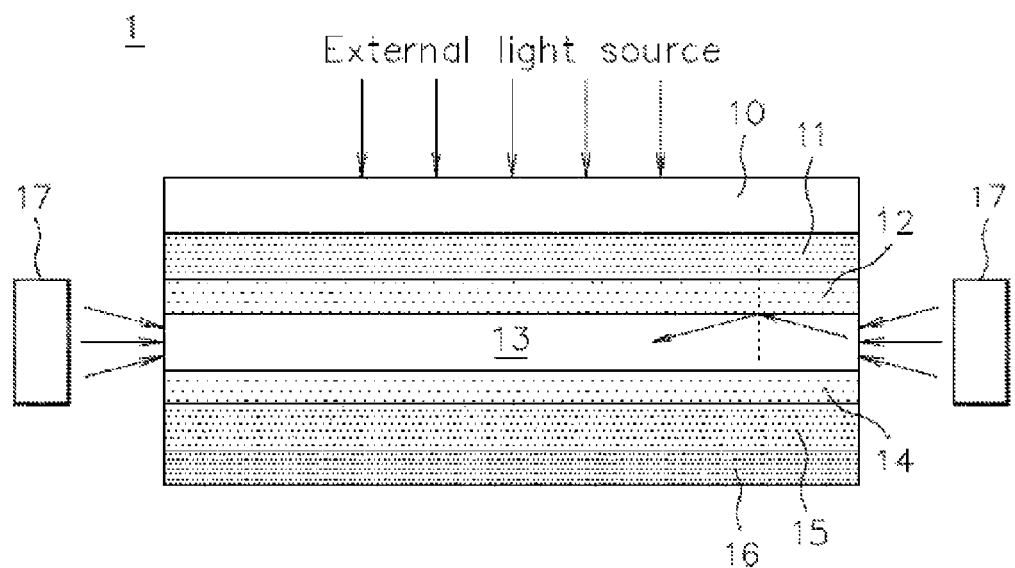
FIG. 1 is a section view diagram of a traditional reflective touch display.
Figure 2:
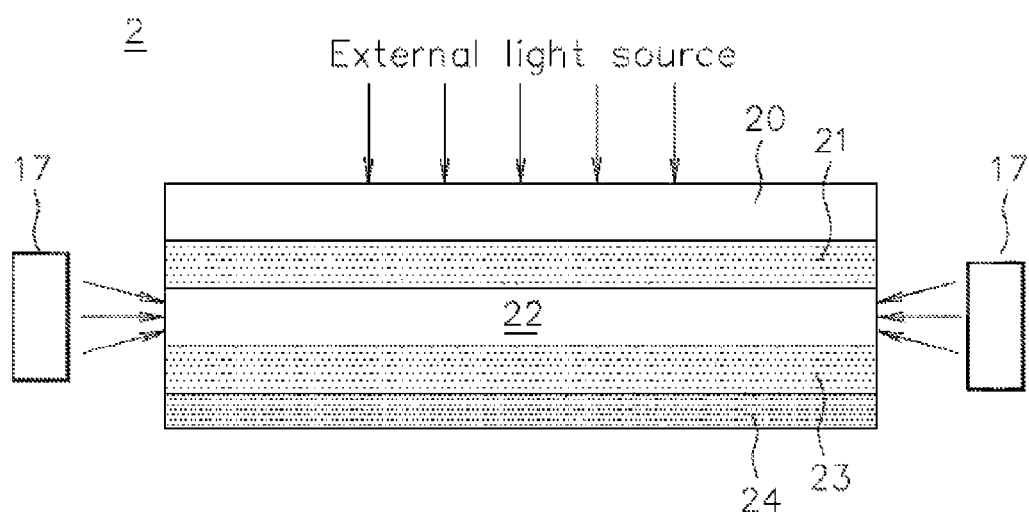
FIG. 2 is a section view diagram of a reflective touch display in accordance with an embodiment of the present disclosure.

FIG. 2 is a section view diagram of a reflective touch display in accordance with an embodiment of the present disclosure. The reflective touch display 2 comprises a touch screen 20, a first bonding layer 23, a second bonding layer 21, a light guiding plate 22, and a reflective display device 24. The light guiding plate 22 is laminated to the top surface of the reflective display device 24 through the first bonding layer 23. The touch screen 20 is laminated to the top surface of the light guiding plate 22 through the second bonding layer 21.

In an embodiment, the touch screen 20 can be a glass screen with multiple layers. Each surface of the glass screen is generally coated with indium tin oxide (ITO) to form a transparent conductive pattern of a touch circuit. In addition, the top layer (outermost layer) of the touch screen 20 can be provided with a protective layer.

Display screen of the reflective display device 24 does not need a back light source such as an electrophoresis display screen. The reflective display device 24 utilizes lighting from surrounding environment for users to be able to view scripts or patterns displayed on the reflective display device 24. In order to increase brightness of the scripts and patterns observed by users, the reflective display device 24 can collect the light transmitting along a small angle and make the light be vertical to the direction of the reflective display device 24. The reflective display device 24 generally comprises a reflective display screen and a diffuser (not shown). The diffuser can either be set on the top surface of the reflective display screen or can be in-built in the reflective display screen.

The first bonding layer 23 preferably comprises a silicone resin or an acrylic resin or a combination thereof. The first bonding layer 23 can be formed by a liquid bonding material by transforming from a liquid state to a solid state. The liquid bonding material is generally a liquid optical adhesive. The first bonding layer 23 can be an ultraviolet light solidified adhesive also known as an ultraviolet light thermal solid adhesive or an ultraviolet light moisture solid adhesive. The ultraviolet light solidified adhesive can be solidified by irradiation of the ultraviolet light to have stable viscidity. The ultraviolet light solidified adhesive also has a characteristic of allowing visible light to penetrate.

Refractive index of the light guiding plate 22 is between 1.47 and 2.02. For illustrations, the light guiding plate 22 can be a glass having refractive index between 1.47 and 2.02. The light guiding plate 22 is used for transmitting the light generated by the built-in light source 17. The reflective touch display 2 further includes a flexible circuit (Not shown) set on a side of the light guiding plate 22, wherein the flexible circuit comprises a plurality of light-emitting diodes, which are used for supplying the built-in light source 17. Refractive index of the first bonding layer 23 is less than that of the light guiding plate 22. Refractive indexes of the first bonding layer 23 and the second bonding layer 21 are between 1.10 and 2.00. For instance, refractive index of the light guiding plate 22 is 1.52, and refractive index of the first bonding layer 23 and second bonding layer 21 is 1.47.

Refractive index of the first bonding layer 23 and second bonding layer 21 is less than that of the light guiding plate 22, and therefore if an angle of incidence of the light which is going to transmit from one surface of the light guiding plate 22 to the second bonding layer 21 is greater than a critical angle, full reflection will occur. Similarly, if an angle of incidence of the light which is going to transmit from the other surface of the light guiding plate 22 to the first bonding layer 23 is greater than a critical angle, full reflection will occur. Thus, incident light from the built-in light source into the light guiding plate 22 is locked in the light guiding plate 22, thereby achieving the effect of light collection. The built-in light source can offset the lack of back light source to enable users to easily view the scripts and patterns that are displayed on the reflective display device 24.

In an embodiment, the second bonding layer 21 comprises a silicone resin, an acrylic resin or a combination thereof. The second bonding layer 21 can be formed by a liquid bonding material that is changed from liquid state to solid state. The liquid bonding material is generally a liquid adhesive such as a liquid optical adhesive. The reason for adopting the liquid bonding material as a main laminating material is that the refractive index of the liquid bonding material can be compounded to change the refractive index of the liquid bonding material, and then an appropriate angle of incidence can achieve an effect of full reflection. Another reason to opt for the liquid adhesive is that a solid adhesive is normally too thin, and therefore the effect of lamination is not good when compared to the liquid adhesive having certain thickness.

The second bonding layer 21 can also be an ultraviolet light solidified adhesive. It is to be noted that refractive index of the second bonding layer 21 can be same as that of the first bonding layer 23, but the present disclosure is not limited to this. The benefit of the second bonding layer 21 and the first bonding layer 23 using material with the same refractive index is that, the second bonding layer 21 and the first bonding layer 23 can be made of same material so that the production cost of the reflective touch display 2 can be reduced.

Figure 3:
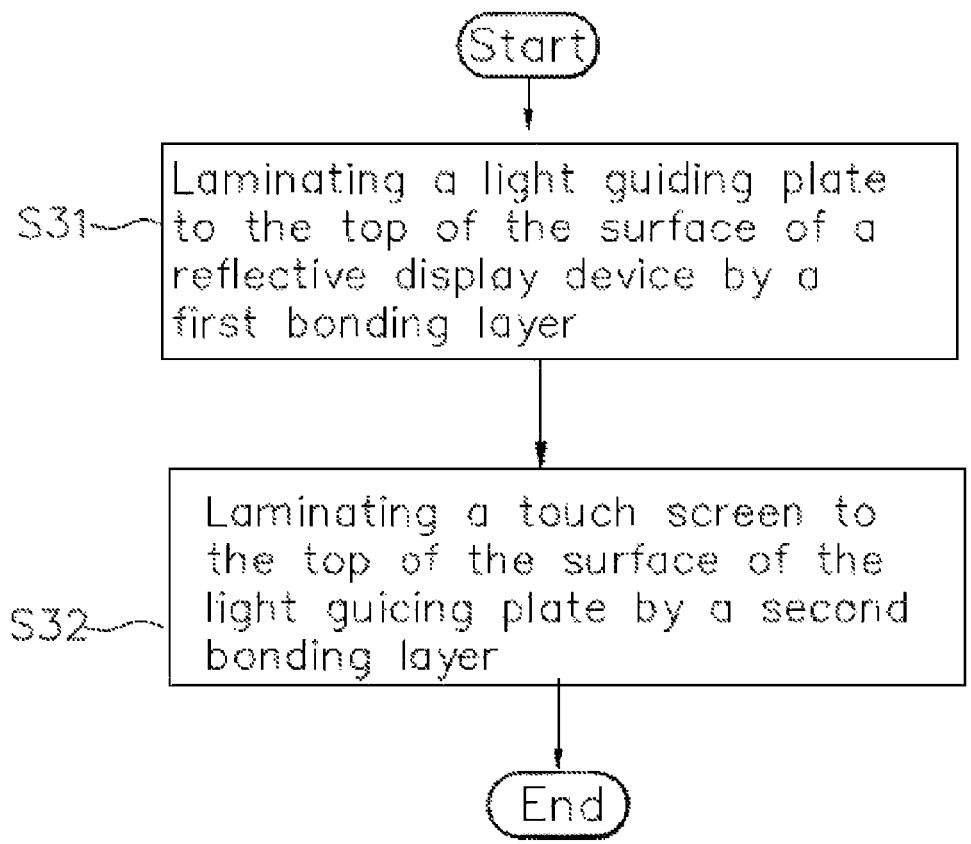
FIG. 3 is a flow chart of a fabrication method of a reflective touch display in accordance with an embodiment of the present disclosure.

FIG. 3 shows flow chart of a fabrication method of a reflective touch display in accordance with an embodiment of the present disclosure. The present fabrication method comprises: step S31, laminating light guiding plate 22 to top surface of a reflective display device 24 through a first bonding layer 23; step S32, laminating a touch screen 20 to top surface of the light guiding plate 22 through a second bonding layer 21, wherein the first bonding layer 23 and the second bonding layer 21 are formed by a liquid bonding material that transforms from a liquid state to a solid state, and wherein refractive indices of the first bonding layer 23 and second bonding layer 21 are less than refractive index of the light guiding plate 22.

Figure 4:
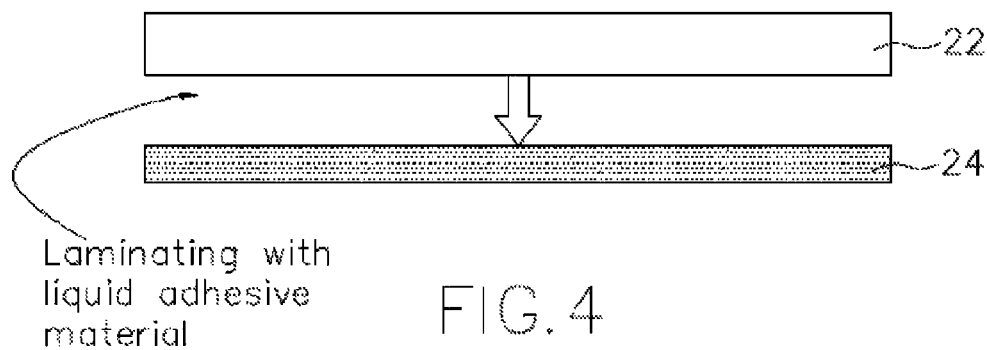
FIG. 4 is a section view diagram of step S31 of the fabrication method of FIG. 3 that corresponds to the reflective touch display in accordance with the embodiment of the present disclosure.

FIG. 4 is a section view diagram of step S31 of the fabrication method that corresponds to the reflective touch display in accordance with the embodiment of the present disclosure. In step S31, section of the structure that is formed by laminating the light guiding plate 22 on top surface of the reflective display device 24 through the first bonding layer 23 is shown, wherein the first bonding layer 23 is made of the liquid bonding material.

Figure 5:
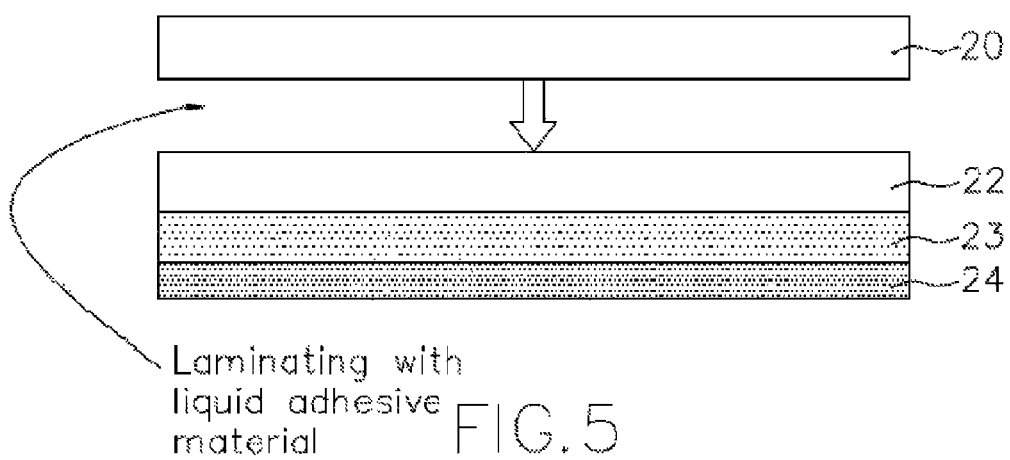
FIG. 5 is a section view diagram of step S32 of the fabrication method of FIG. 3 that corresponds to the reflective touch display in accordance with the embodiment of the present disclosure.

FIG. 5 is a section view diagram of step S32 of the fabrication method that corresponds to the reflective touch display in accordance with the embodiment of the present disclosure. In step S32, section of the structure that is formed by laminating the touch screen 20 on top surface of the light guiding plate 22 through the second bonding layer 21 is shown. The first bonding layer 23 is also made of the liquid bonding material.

The fabrication method of the present embodiment is used to form reflective touch display 2. The reflective touch display 2 can be referred to the previous embodiments, and is not illustrated here again. After the step S32, the built-in light source 17 can be set on the side of the light guiding plate 22 to enable light generated by the built-in light source 17 to send into the light guiding plate 22.

According to the embodiment of the present disclosure, foregoing reflective touch display and fabrication method helps increase the yield rate of the reflective touch display and reduces the manufacturing cost. Furthermore, the fabrication process of the reflective touch display is simplified and the reflective touch display can maintain a good optical property.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A reflective touch display, comprising:
a reflective display device;
a first bonding layer;
a light guiding plate laminated to top surface of the reflective display device through said first bonding layer;
a second bonding layer; and
a touch screen laminated to top surface of the light guiding plate through said second bonding layer, wherein the first bonding layer and the second bonding layer are formed by a liquid bonding material that transforms from a liquid state to a solid state, and wherein the refractive index of each of the first bonding layer and the second bonding layer is less than the refractive index of said light guiding plate, wherein a full reflection is achieved when an angle of an incident light transmitting from the light guiding plate to the first bonding layer or the second bonding layer is greater than a critical angle, wherein the refractive index of each of the first bonding layer and the second bonding layer is between 1.10 and 2.00.

2. The reflective touch display of claim 1, wherein refractive index of said light guiding plate is between 1.47 and 2.02.

3. The reflective touch display of claim 1, wherein said reflective display device further comprises of a reflective display screen; and a diffuser disposed on top surface of said reflective display screen.

4. The reflective touch display of claim 1, wherein said reflective display device further comprises: a reflective display screen; and a diffuser, wherein said diffuser is embedded in said reflective display screen.

5. The reflective touch display of claim 1, wherein the first bonding layer and the second bonding layer comprises a silicone resin, an acrylic resin, or a combination of said silicone resin and said acrylic resin.

6. The reflective touch display of claim 1, wherein said liquid bonding material is a liquid optical adhesive.

7. The reflective touch display of claim 1, wherein said first bonding layer and said second bonding layer is an ultraviolet solidified adhesive.

8. The reflective touch display of claim 1, further comprising: a flexible circuit disposed on a side of said light guiding plate, wherein said flexible circuit comprises a plurality of light-emitting diodes, wherein said plurality of light-emitting diodes are used for supplying built-in light source.

9. A fabrication method of a reflective touch display comprising:
laminating a light guiding plate to a top surface of a reflective display device through a first bonding layer; and
laminating a touch screen to the top surface of the light guiding plate through a second bonding layer, wherein said first bonding layer and said second bonding layer are formed by a liquid bonding material that transforms from a liquid state to a solid state, wherein the refractive index of each of the first bonding layer and the second bonding layer is less than the refractive index of the light guiding plate, wherein a full reflection is achieved when an angle of an incident light transmitting from the light guiding plate to the first bonding layer or the second bonding layer is greater than a critical angle, and wherein the refractive index of each of the first bonding layer and the second bonding layer is between 1.10 and 2.00.

10. The fabrication method of the reflective touch display of claim 9, wherein refractive index of said light guiding plate is between 1.47 and 2.02.

11. The fabrication method of the reflective touch display of claim 9, wherein said reflective display device further comprises: a reflective display screen; and a diffuser disposed on top surface of said reflective display screen.

12. The fabrication method of the reflective touch display of claim 11, wherein said diffuser is embedded in said reflective display screen.

13. The fabrication method of the reflective touch display of claim 9, wherein the first bonding layer and the second bonding layer comprises a silicone resin, an acrylic resin, or a combination of said silicone resin and said acrylic resin.

14. The fabrication method of the reflecting touch display of claim 9, wherein the first bonding layer and second bonding layer are ultraviolet solidified adhesive.

15. The fabrication method of the reflecting touch display of claim 9, further comprising: laminating a flexible circuit on side of said light guiding plate, wherein said flexible circuit comprises a plurality of light-emitting diodes used for supplying built-in light source.

16. The reflective touch display of claim 1, wherein the touch screen is a glass screen with multiple layers, and each surface of the glass screen is coated with indium tin oxide to form a transparent conductive pattern of a touch circuit, and wherein an outermost layer of the multiple layers of the touch screen is a protective layer.

17. The reflective touch display of claim 1, wherein the reflective touch display is an electrophoresis display screen.

18. The fabrication method of the reflecting touch display of claim 9, wherein the touch screen is a glass screen with multiple layers, and each surface of the glass screen is coated with indium tin oxide to form a transparent conductive pattern of a touch circuit, and wherein an outermost layer of the multiple layers of the touch screen is a protective layer.

19. The fabrication method of the reflecting touch display of claim 9, wherein the reflective touch display is an electrophoresis display screen.

* * * * *